United States Patent
Sowul et al.

(10) Patent No.: US 8,065,930 B2
(45) Date of Patent: Nov. 29, 2011

(54) HYDRAULIC ACTUATOR FOR TRANSMISSIONS HAVING REDUCED NOISE

(75) Inventors: Henryk Sowul, Oxford, MI (US); Tejinder Singh, Canton, MI (US); Brian W. Whitmarsh, Commerce, MI (US); Brian Tooman, Canton, MI (US); James D. Hendrickson, Belleville, MI (US); Richard A. Pashnik, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 888 days.

(21) Appl. No.: 12/056,004

(22) Filed: Mar. 26, 2008

(65) Prior Publication Data

US 2009/0241714 A1 Oct. 1, 2009

(51) Int. Cl.
*B60K 17/10* (2006.01)
*F15B 15/22* (2006.01)

(52) U.S. Cl. ............ 74/473.11; 91/399; 91/401

(58) Field of Classification Search ............ 74/473.1, 74/473.11, 473.36; 91/399, 401, 404, 405, 91/406, 407, 408, 409; 92/85 B, 85 R
See application file for complete search history.

(56) References Cited

U.S. PATENT DOCUMENTS

| | | | | |
|---|---|---|---|---|
| 3,094,900 A | * | 6/1963 | Wandel et al. | 91/423 |
| 6,553,889 B2 | * | 4/2003 | Migliori | 91/394 |

* cited by examiner

*Primary Examiner* — Thomas R Hannon
*Assistant Examiner* — Phillip A Johnson

(57) ABSTRACT

The present invention provides a three position hydraulic piston assembly for a gear ratio change mechanism for a transmission exhibiting reduced gear shift noise. The three position hydraulic piston assembly includes a master piston and motion retarding assemblies that act near both travel limits of the master piston. The master piston includes symmetrical passageways that provide hydraulic fluid flow to small chambers at each end of the piston that are closed off as the piston approaches its travel limits. Hydraulic fluid trapped in the chambers decelerates the piston and is bled off through an orifice allowing the piston to reach its travel limit and quickly and quietly engage a gear ratio.

19 Claims, 3 Drawing Sheets

HYDRAULIC ACTUATOR FOR TRANSMISSIONS HAVING REDUCED NOISE

FIELD

The present disclosure relates to a hydraulic actuator for transmissions for motor vehicles and more particularly to a hydraulic actuator having reduced noise for transmissions for motor vehicles.

BACKGROUND

The statements in this section merely provide background information related to the present disclosure and may or may not constitute prior art.

In dual clutch transmissions (DCT's) and manual transmission automation (MTA), gear ratio changes are typically accomplished by double acting hydraulic cylinders. One side of a cylinder is pressurized with hydraulic fluid while the other side is exhausted to move a piston and associated shift rail, fork and synchronizer clutch in one direction to engage one gear and the opposite activity engages another gear. The double acting cylinder is configured to also provide a center or neutral position.

One of the acknowledged features and benefits of dual clutch transmissions is their ability to rapidly shift gears. Such rapid gear shifts actually are achieved when one of the dual clutches engaging the current gear ratio on one countershaft is released and the other clutch on the other countershaft is engaged, the newly selected gear ratio having been previously pre-engaged by the process described above.

Notwithstanding such gear ratio pre-selection and its attendant shift time reduction, there is still a desire and demand to even more rapidly change gear ratios. The speed of such gear ratio changes may be increased by many commonly known approaches: increasing the hydraulic pressure, increasing the flow rate of the hydraulic fluid and increasing the size of the hydraulic cylinder. Unfortunately, all of these approaches carry with them the essential certainty of increased noise of a very noticeable and objectionable type. The noise will not be, for example, a continuous or low frequency sound which might not be noticeable given the other sounds from the vehicle but will be a distinct and abrupt impact or clunk as the piston, shift rail and gear come to a sudden stop upon reaching the limit of travel and engagement.

This problem has not gone unrecognized and significant effort has been expended to rectify it. One of the more accepted solutions is referred to as apply pressure profiling. This involves controlling or adjusting the hydraulic pressure applied to a piston and reducing it as the piston approaches its travel limit to slow it in order to minimize the noise generated as it stops. Clearly this solution to gear ratio change noise is a compromise as it results in slower average piston travel and thus slower gear engagement. Furthermore, it significantly increases the complexity of the electronic control and driver circuitry as modulating control of the pressure of the hydraulic fluid must now be provided. Finally, if the travel of the hydraulic piston is very short, there is simply not enough time to achieve effective pressure profiling due to the inertia of the mechanical components of the system.

From the foregoing, it is apparent that noise reduction improvements in the art of gear ratio change mechanisms for dual clutch and other transmissions would be desirable and the present invention is so directed.

SUMMARY

The present invention provides a three position hydraulic piston assembly for a gear ratio change mechanism for a transmission which exhibits reduced gear shift noise. The gear change mechanism includes a synchronizer clutch engaged by a shift fork and rail which, in turn, is acted upon by a three position hydraulic piston assembly having a motion retarding assembly that acts near both travel limits of the hydraulic piston. The hydraulic piston includes symmetrical passageways that provide fluid flow to small chambers at each end of the piston that are closed off by small pistons as the hydraulic piston approaches its travel limits. Fluid trapped in the chambers decelerates the hydraulic piston and is bled off through an orifice allowing the piston to reach its travel limit and quickly and quietly engage a gear ratio.

Thus it is an object of the present invention to provide a hydraulic actuator for transmissions having reduced operating noise.

It is a further object of the present invention to provide a three position hydraulic actuator for transmissions having reduced operating noise.

It is a still further object of the present invention to provide a three position hydraulic actuator having a piston defining passageways and chambers which receive hydraulic fluid which decelerates the piston as it approaches its travel limits.

It is a still further object of the present invention to provide a three position hydraulic actuator having reduced operating noise for achieving gear shifts in a vehicle transmission.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
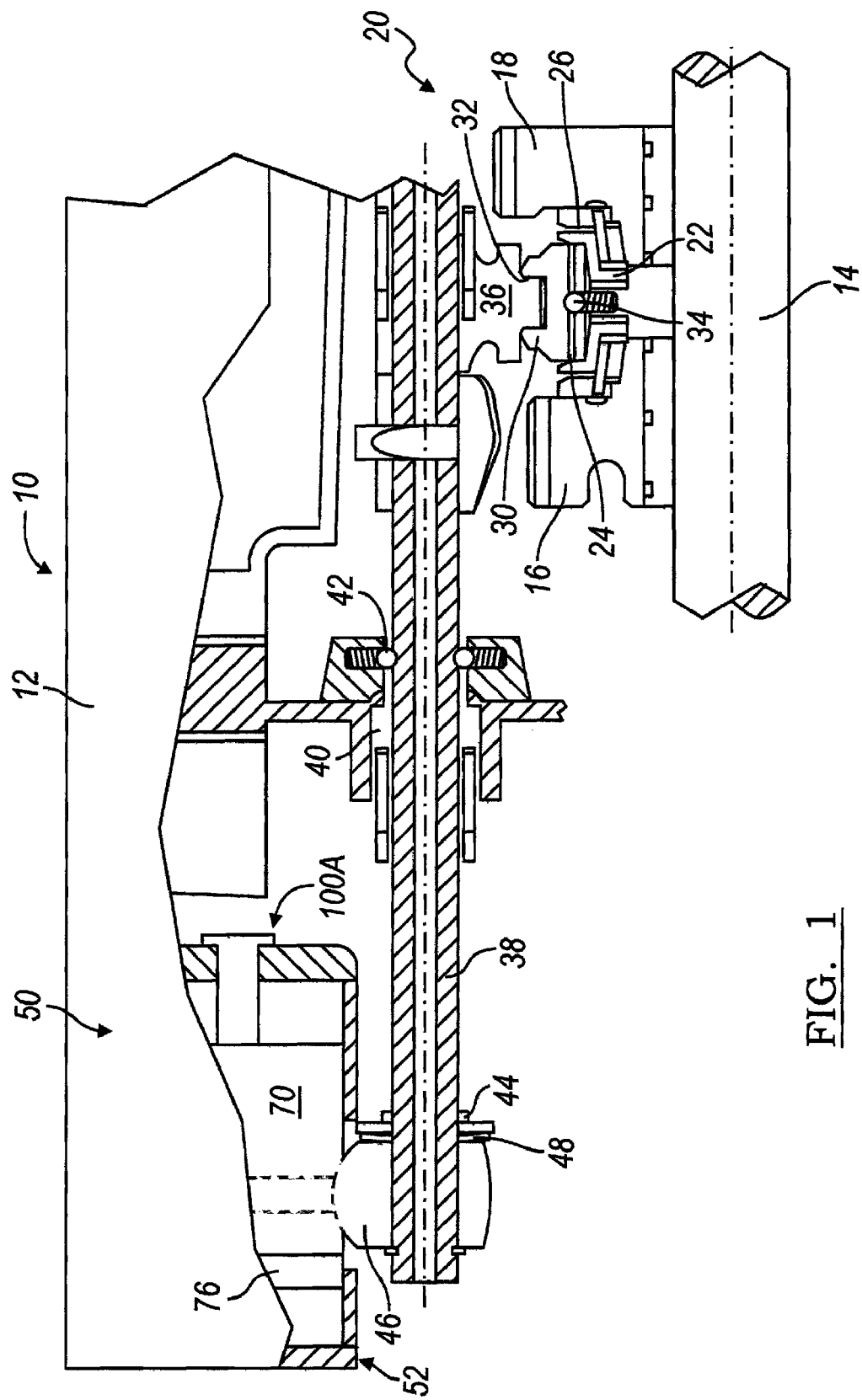
FIG. 1 is a side elevational view of a portion of a dual clutch transmission incorporating the present invention.

With reference now to FIG. 1, a portion of a dual clutch transmission is illustrated and generally designated by the reference number 10. It should be appreciated that while the invention is described and illustrated in conjunction with a dual clutch transmission, the invention has broad application in other types of transmissions such as MTA applications and a broad array of other hydraulically actuated or controlled devices. The transmission 10 includes a housing 12 which surrounds, supports and protects various components such as a counter shaft or layshaft 14 which freely rotatably supports a pair of distinctly sized gears, a first, smaller gear 16 and a second, larger gear 18. Disposed between the first gear 16 and the second gear 18 on the countershaft or layshaft 14 is a synchronizer clutch assembly 20 having an opposed pair of synchronizers 22 and opposed sets of face clutch or gear teeth 24 which mutually exclusively cooperate with face clutch or gear teeth 26 on the first gear 16 and the second gear 18. An annular shift collar 30 includes a circumferential channel or groove 32 and a first detent mechanism 34. The circumferential channel or groove 32 of the shift collar 30 receives a shift fork 36 which is secured to and translates with a shift rail 38. The shift rail 38 is constrained for axial bidirectional movement in one or more openings or passageways 40 in the housing 12 (or a feature of the housing 12 such as a bracket or extension) and may be detented by one or a pair of second detent mechanisms 42. Also attached to the shift rail 36 by, for example, cooperating grooves and snap rings 44 is an apply finger 46. A Belleville or wave washer 48 may also be utilized to ensure a positive though slightly resilient connection between the shift rail 36 and the apply finger 46.

Figure 2:
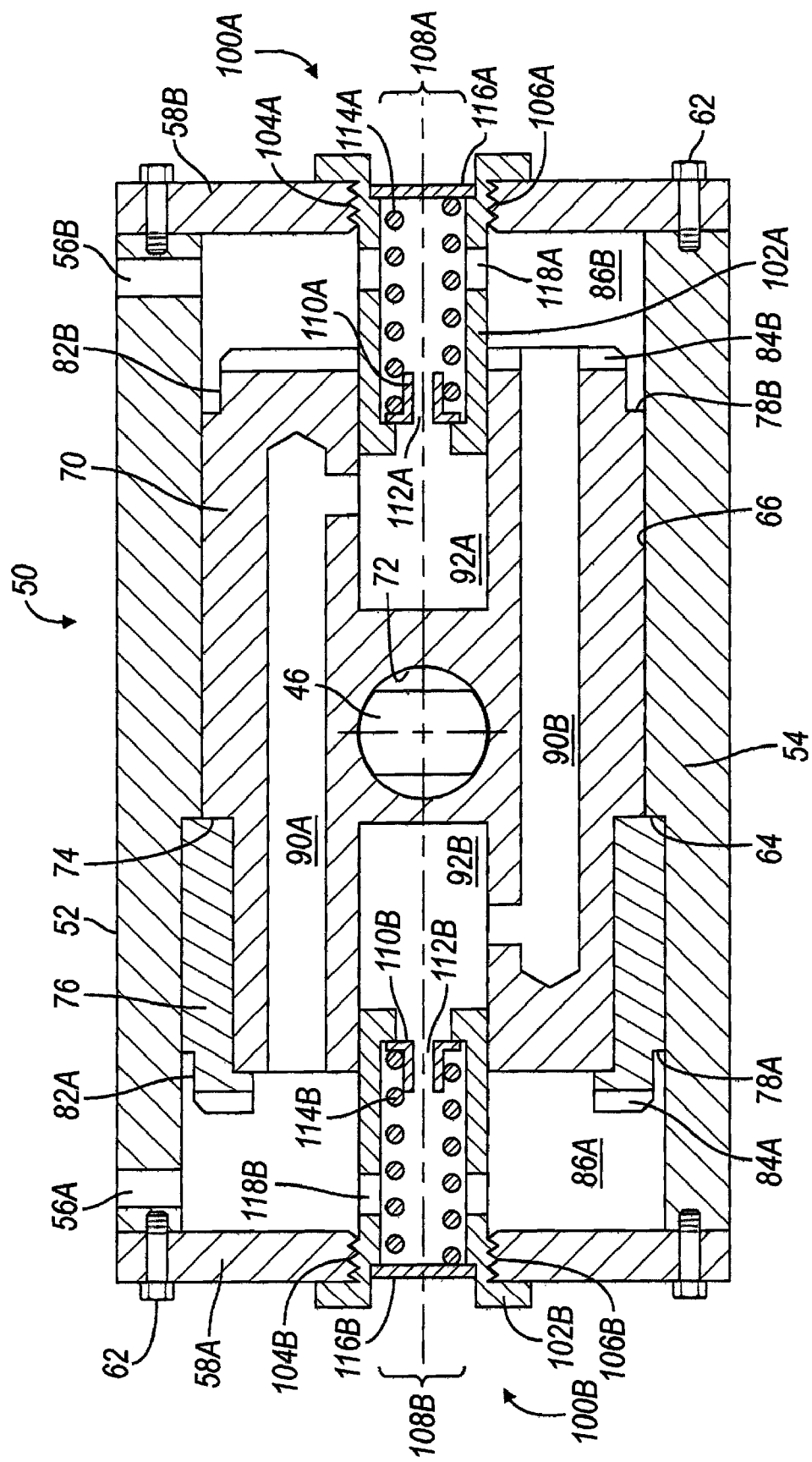
FIG. 2 is a top plan view of a hydraulic actuator of a dual clutch transmission incorporating the present invention in a center or neutral position.

Referring now to FIGS. 1 and 2, the apply finger 46 is bi-directionally translated by a three position hydraulic actuator assembly 50. Specifically, the three position hydraulic actuator assembly 50 includes a housing 52. For ease of manufacture and assembly, the housing 52 may comprise a cylindrical portion 54 defining a first or left inlet port 56A and a second or right inlet port 56B. It should be appreciated that while characterized as "inlet ports," since that is their primary operational function, because there are no other passageways leading into or out of the housing 52, the ports 56A and 56B also function as outlet or exhaust ports during certain phases of operation. The housing 52 also includes a first or left end plate 58A and a second or right end plate 58B. The end plates 58A and 58B may be identical and may be secured to the cylindrical portion 54 of the housing 52 by any suitable means such as, for example, threaded fasteners 62.

The cylindrical portion 54 of the housing 52 includes an internal circumferential shoulder 64 that defines a stepped cylinder 66 that slidingly and sealingly receives a master piston 70. The master piston 70 includes a centrally disposed radial passageway 72 that receives and engages the apply finger 46. One end of the master piston 70 is stepped and defines an external circumferential shoulder 74. The smaller diameter region of the master piston 70 adjacent the external circumferential shoulder 74 receives an annular neutral or center position piston 76. The neutral or center position piston 76 cooperates with the master piston 70 to achieve, with suitable application of pressurized hydraulic fluid through the two inlet ports 56A and 56B, three positions of the master piston 70: a position to the left, adjacent the first or left inlet port 56A, a center or neutral position as illustrated in FIG. 2 and a position to the right, adjacent the second or right inlet port 56B. Inasmuch as those skilled in the art of hydraulic actuators will be familiar with such a configuration and its operation, this aspect of the three position hydraulic actuator assembly 50 will not be further described.

The end of the neutral or center position piston 76 proximate the left inlet port 56A itself includes a first circumferential shoulder 78A defining a first reduced diameter portion 82A of the center position piston 76 and the adjacent end of the center position piston 76 includes a first plurality of radially oriented channels 84A. Both the first reduced diameter portion 82A and the first plurality of radially oriented channels 84A facilitate rapid filling of a first or left chamber 86A of the stepped cylinder 66 notwithstanding the leftmost disposition of the master piston 70 and the center position piston 76 which might otherwise momentarily interfere with fluid flow through the first or left inlet port 56A and into the first or left chamber 86A.

The end of the master piston 70 adjacent the second or right inlet port 56B similarly includes a second circumferential shoulder 78B defining a second reduced diameter portion 82B of the master piston 70 and the adjacent end of the master piston 70 includes a second plurality of radially oriented channels 84B. The second reduced diameter portion 82B and the second plurality of radially oriented channels 84B function as described directly above to facilitate rapid filling of a second or right chamber 86B notwithstanding the rightmost disposition of the master piston 70.

The master piston 70 also includes a first longitudinal passageway and port 90A that provides fluid communication between the first or left chamber 86A and a first retarding cylinder or chamber 92A. Slidingly and sealingly received within the first retarding chamber 92A is a first side pin assembly 100A. The first side pin assembly 100A cooperates with the first retarding chamber 92A and functions as a piston. The first side pin assembly 100A includes a first hollow cylindrical body 102A having male threads 104A on an enlarged portion of the first cylindrical body 102A which are complementary to female threads 106B in an opening 108B in the second or right end plate 58B. The first hollow cylindrical body 102A receives a first end plug 110A defining a first orifice 112A sized to provide a controlled fluid flow as will be described subsequently. The first end plug 110A is maintained in its position at the inner end of the first hollow cylindrical body 102A by a first compression spring 114A which, in turn, is retained within the first hollow cylindrical body 102A by a first end cap 116A which may be press fit into the first hollow cylindrical body 102A or retained there by a snap ring (not illustrated). One or a plurality of first radial passageways 118A provide fluid communication between the interior of the first hollow cylindrical body 102A and the second or right chamber 86B.

The three position hydraulic actuator assembly 50 is essentially symmetrical in both structure and operation. Thus it will be appreciated that the master piston 70 also includes a second longitudinal passageway and port 90B communicating between the second or right chamber 86B and a second retarding cylinder or chamber 92B. Likewise, slidingly and sealingly received within the second retarding chamber 92B is a second side pin assembly 100B. The second side pin assembly 100B cooperates with the second retarding chamber 92B and functions as a piston. The second side pin assembly 100B includes a second hollow cylindrical body 102B having male threads 104B which are complementary to female threads 106B in an opening 108B in the first or left end plate 58A. The second cylindrical body 102B receives a second end plug 110B defining a second orifice 112B sized to provide a controlled fluid flow as will be described subsequently. The second end plug 110B is maintained in its position at the inner end of the second cylindrical body 102B by a second compression spring 114B which, in turn, is retained within the second cylindrical body 102B by a second end cap 116B. One or a plurality of second radial passageways 118B provide fluid communication between the interior of the first hollow cylindrical body 102B and the first or left chamber 86A.

Figure 3:
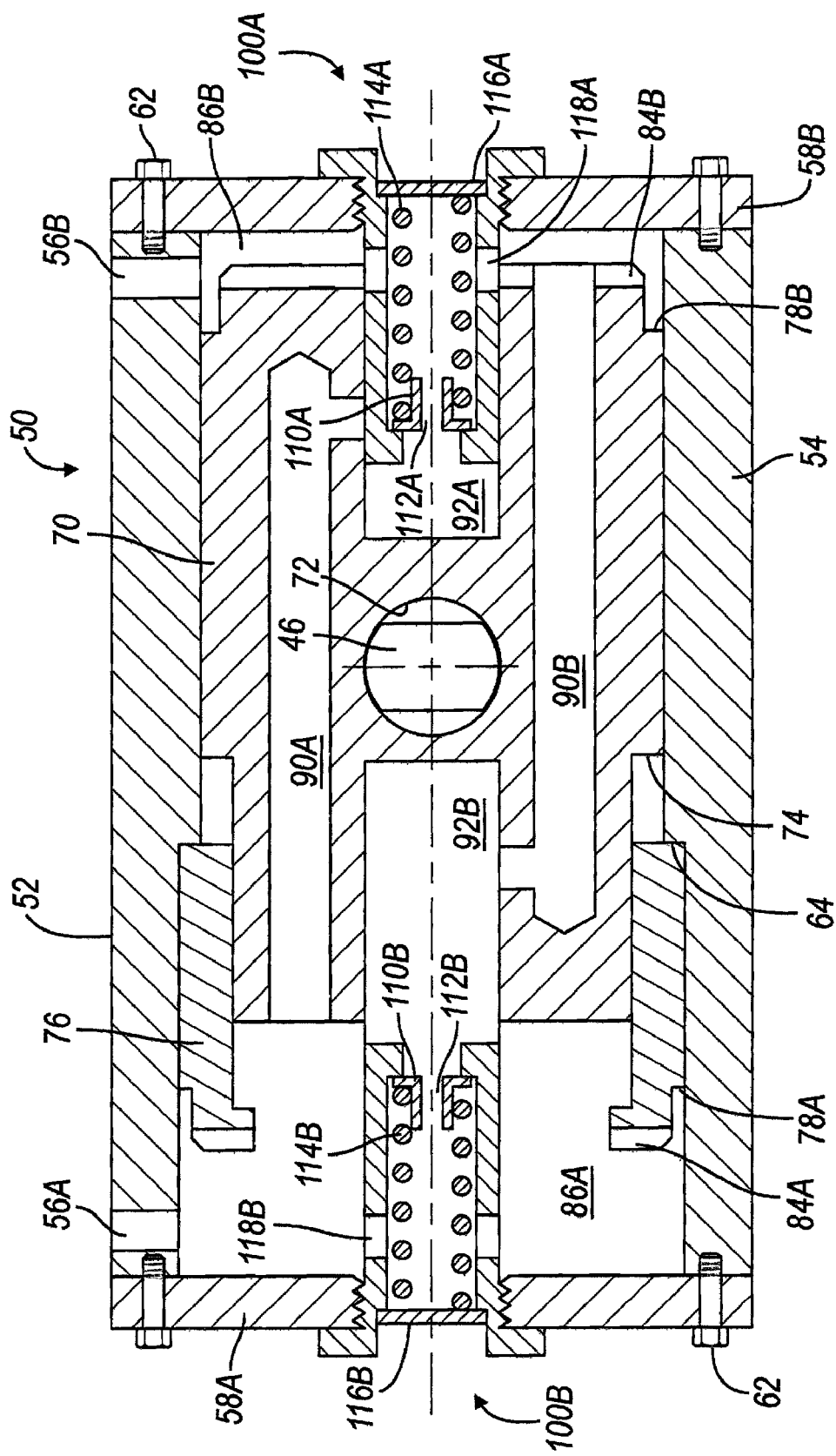
FIG. 3 is a top plan view of a hydraulic actuator of a dual clutch transmission incorporating the present invention in which a piston is approaching a gear engaging position.

As noted above, operation of the three position hydraulic actuator assembly 50 is essentially symmetrical and thus only operation (translation) from its center or neutral position illustrated in FIG. 2 to a position to the right as illustrated in FIG. 3 to engage the second gear 18 (illustrated in FIG. 1) will be described, it being understood that translation to the left involves the same operational steps.

To translate the master piston 70 to the right to engage the second gear 18, pressurized hydraulic fluid is supplied to the first or left inlet port 56A while the second or right inlet port 56B and the second or right chamber 66B is exhausted. Pressurized hydraulic fluid in the first or left chamber 66A commences to translate the master piston 70 to the right in FIG. 2 and it also flows through the first longitudinal passageway and port 90A and fills and pressurizes the first retarding chamber 92A. As the master piston 70 continues to translate to the right, the end of the first cylindrical body 102A of the first side pin assembly 100A will close off the first longitudinal passageway and port 90A. Additional motion of the master piston 70 will increase the pressure of the hydraulic fluid in the first retarding chamber 92A, thereby beginning to slow the master piston 70.

The volume and thus the pressure of the hydraulic fluid in the first retarding chamber 92A is controlled by the first orifice 112A, specifically, its size. The size of the first orifice 112A is chosen to essentially be a compromise between noise (clunk) reduction and shift speed, that is, a larger first orifice 112A will allow shifts to be completed more rapidly whereas a smaller first orifice 112A will result in greater noise reduction.

During certain operating conditions, typically at low temperatures, an otherwise desirable size of the first orifice 112A may not provide sufficient hydraulic fluid flow, pressures may reach a high level and shifts may not be completed in what is considered to be an acceptable time. In such conditions, the hydraulic pressure will compress the first compression spring 114A and the first end plug 110A will move off its seat, allowing a rapid flow of hydraulic fluid into the interior of the first cylindrical body 102A, out the first radial passageways 118A and into the right chamber 86B from which it is exhausted through the second or right inlet port 56B.

It will thus be appreciated that the hydraulic actuator assembly 50 according to the present invention provides both rapid and quiet travel of the master piston 70 and gear engagement for a dual clutch transmission, in MTA applications or other transmissions. The actuator assembly 50 achieves this goal without complex electronic controls and modulatable control valves which have been utilized in the past to provide fluid pressure profiling to decelerate the actuator piston as it approaches the ends of its stroke.

It should also be appreciated that the hydraulic actuator assembly 50 according to the present invention and the associated shift rail 36, the shift fork 34 and the synchronizer clutch assembly 20 will typically be utilized in groups of three or four in vehicle transmissions having, for example, five or more forward gears and reverse.

Finally, it should also be appreciated that although the hydraulic actuator assembly 50 according to the present invention having reduced operating noise has been described above as a three position (double acting) actuator having a defined center position and two end positions, the noise reduction feature of the present invention is equally suitable for use in a single acting actuator. In this instance, the master piston 70 would require only a single longitudinal passageway and port, for example, the first longitudinal passageway and port 90A, as well as only one retarding cylinder or chamber, for example, the first retarding chamber 92A and one slide pin assembly, for example, the first slide pin assembly 100A. The annular neutral or center position piston 76 can, of course, be eliminated in a single acting device. The foregoing listing is not and is not intended to be exhaustive but rather to present the more important components necessary to achieve noise reduction in a single acting hydraulic piston and cylinder assembly.

The description of the invention is merely exemplary in nature and variations that do not depart from the gist of the invention are intended to be within the scope of the invention. Such variations are not to be regarded as a departure from the spirit and scope of the following claims.

What is claimed is:

1. A hydraulic actuator, for actuating a mechanical member, comprising, in combination,
   a housing defining a cylinder and having a fluid port communicating with said cylinder,
   a first piston defining a chamber at one end having a sidewall and a fluid passageway extending from said sidewall of said chamber to an opposite end, said opposite end adjacent said fluid port,
   a second piston immovably secured to said housing and aligned with said chamber, said second piston including a hollow interior and an orifice for controlling fluid flow from said chamber, and wherein said orifice is defined by a moveable plug and said plug is biased by a spring disposed in said hollow interior.

2. The hydraulic actuator of claim 1 wherein said first piston includes means for engaging a portion of said mechanical member.

3. The hydraulic actuator of claim 2 wherein said engaging means is a radial bore.

4. The hydraulic actuator of claim 1 wherein said housing includes a pair of end plates and said second piston is secured to one of said end plates.

5. The hydraulic actuator of claim 1 wherein said second piston includes at least one port communicating with said interior.

6. A hydraulic actuator for a mechanism of a transmission comprising, in combination,
   a housing defining a cylinder and having a pair of fluid ports communicating with said cylinder,
   a first piston defining a first chamber and a second chamber, said first chamber disposed at a first end of said first piston and having a first sidewall, a first fluid passageway extending from said first sidewall to a second end of said first piston, said second end adjacent one of said fluid ports, said second chamber disposed at a second end of said first piston and having a second sidewall, a second fluid passageway extending from said second sidewall to a first end of said first piston, said first end adjacent another one of said fluid ports,
   a first chamber piston secured to said housings and aligned with said first chamber, said first chamber piston including an orifice for controlling fluid flow from said first chamber, and
   a second chamber piston secured to said housing and aligned with said second chamber, said second chamber piston including an orifice for controlling fluid flow from said second chamber.

7. The hydraulic actuator of claim 6 wherein said first piston includes means for engaging a portion of a gear shift mechanism.

8. The hydraulic actuator of claim 7 wherein said engaging means is a radial bore.

9. The hydraulic actuator of claim 6 wherein said housing includes a pair of end plates and said first and said second chamber pistons are secured to a respective one of said end plates.

10. The hydraulic actuator of claim 6 wherein said first and second chamber pistons define a hollow interior and include at least one port communicating with said interior.

11. The hydraulic actuator of claim 10 wherein said orifices are defined by a plug communicating with said hollow interior and including a compression spring for biasing said plug.

12. The hydraulic actuator of claim 6 further including a neutral center piston disposed in said cylinder and cooperating with said first piston.

13. The hydraulic actuator of claim 6 further including a shoulder and radial grooves on one end of said first piston.

14. A hydraulic actuator for a gear shift mechanism comprising, in combination, a master piston and cylinder assembly, said cylinder having fluid ports at each end, said master piston having a first end and a second end, a first passageway extending from said first end to a first chamber at said second end and a second passageway extending from said second end to a second chamber at said first end, a first piston disposed at one of said ends of said cylinder and aligned with said first chamber, said first piston including an orifice for controlling fluid flow from said first chamber, and a second piston disposed at another of said ends of said cylinder and aligned with said second chamber, said second piston including a second orifice for controlling fluid flow from said second chamber.

15. The hydraulic actuator of claim 14 wherein said chambers define sidewalls and said passageways define a port in said sidewalls.

16. The hydraulic actuator of claim 14 further including a neutral center piston disposed in said cylinder and cooperating with said master piston.

17. The hydraulic actuator of claim 16 further including a shoulder and radial grooves on one end of said master piston and on said neutral center piston.

18. The hydraulic actuator of claim 14 wherein said master piston includes means for engaging a portion of a gear shift mechanism.

19. The hydraulic actuator of claim 14 wherein said first and second pistons define a hollow interior and include at least one port communicating with said interior.

* * * * *